(12) United States Patent
Morris et al.

(10) Patent No.: US 8,432,128 B2
(45) Date of Patent: Apr. 30, 2013

(54) PROXIMITY POWER PAD

(75) Inventors: Julie A. Morris, Raleigh, NC (US); Philip J. Jakes, Durham, NC (US); Michael T. Matthews, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 525 days.

(21) Appl. No.: 12/495,223

(22) Filed: Jun. 30, 2009

(65) Prior Publication Data
US 2010/0327801 A1 Dec. 30, 2010

(51) Int. Cl.
*H02J 7/00* (2006.01)

(52) U.S. Cl.
USPC .......................................... 320/108; 320/107

(58) Field of Classification Search .................. 320/108, 320/107, 115; 307/104
See application file for complete search history.

(56) References Cited

U.S. PATENT DOCUMENTS

| 7,952,322 B2* | 5/2011 | Partovi et al. ................. 320/108 |
| 7,986,059 B2* | 7/2011 | Randall ......................... 307/104 |
| 8,049,370 B2* | 11/2011 | Azancot et al. ................ 307/104 |
| 2010/0039066 A1* | 2/2010 | Yuan et al. ..................... 320/108 |
| 2010/0314946 A1* | 12/2010 | Budde et al. ................... 307/104 |

\* cited by examiner

*Primary Examiner* — Richard V Muralidar
(74) *Attorney, Agent, or Firm* — Schwegman, Lundberg & Woessner, P.A.

(57) ABSTRACT

A polygonal power pad includes an optional connector to connect to a power supply and a power network in the power pad. At least one power connector is coupled to the power network and is disposed on a periphery of the pad. The power connector is operable to receive and provide power to a provided adjacent pad. At least one power transfer coil embedded in the pad, is coupled to the power network to transfer power to a device proximate the pad.

20 Claims, 5 Drawing Sheets

PROXIMITY POWER PAD

BACKGROUND

Inductive proximity power pads utilize a transmitter coil to provide power to one or more devices having receiver coils. Power is transmitted from the transmitter coil to the receiver coil when the device is placed in proximity to the transmitter coil on or about the power pad. Each power pad has a connector to connect to a power supply, such as an outlet. If several people are meeting in a room with a limited number of outlets, there can be contention for use of the outlets to recharge their devices, such as laptop computers and various wireless devices.

SUMMARY

A power pad includes a power network and at least one power connector coupled to the power network and disposed on a periphery of the pad and operable to exchange power to a provided adjacent pad. At least one power transfer mechanism is embedded in the pad and coupled to the power network to transfer power to a device proximate the pad. An optional connector may be provided to connect to a power supply.

In one embodiment, a method includes embedding at least one proximity power transfer mechanism in a polygonal pad. A power transfer network is formed in the polygonal pad that is coupled to the at least one proximity power transfer coil. At least one power transfer connector is provided on a peripheral portion of the polygonal pad to mate with a power transfer connector on an adjacent polygonal pad to transfer power between the two polygonal pads.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Various embodiments of inductive proximity power pads of various shapes are described. The power pads include transmitter coils to transfer power to receiver coils that are in proximity to the power pads. The power pads may be thought of as jigsaw puzzle pieces with power connector on their edges that may be coupled to form different shapes of sets of power pads that share or exchange power between them. One of the power pads may be coupled to a power supply to provide power to all the connected power pads.

Figure 1:
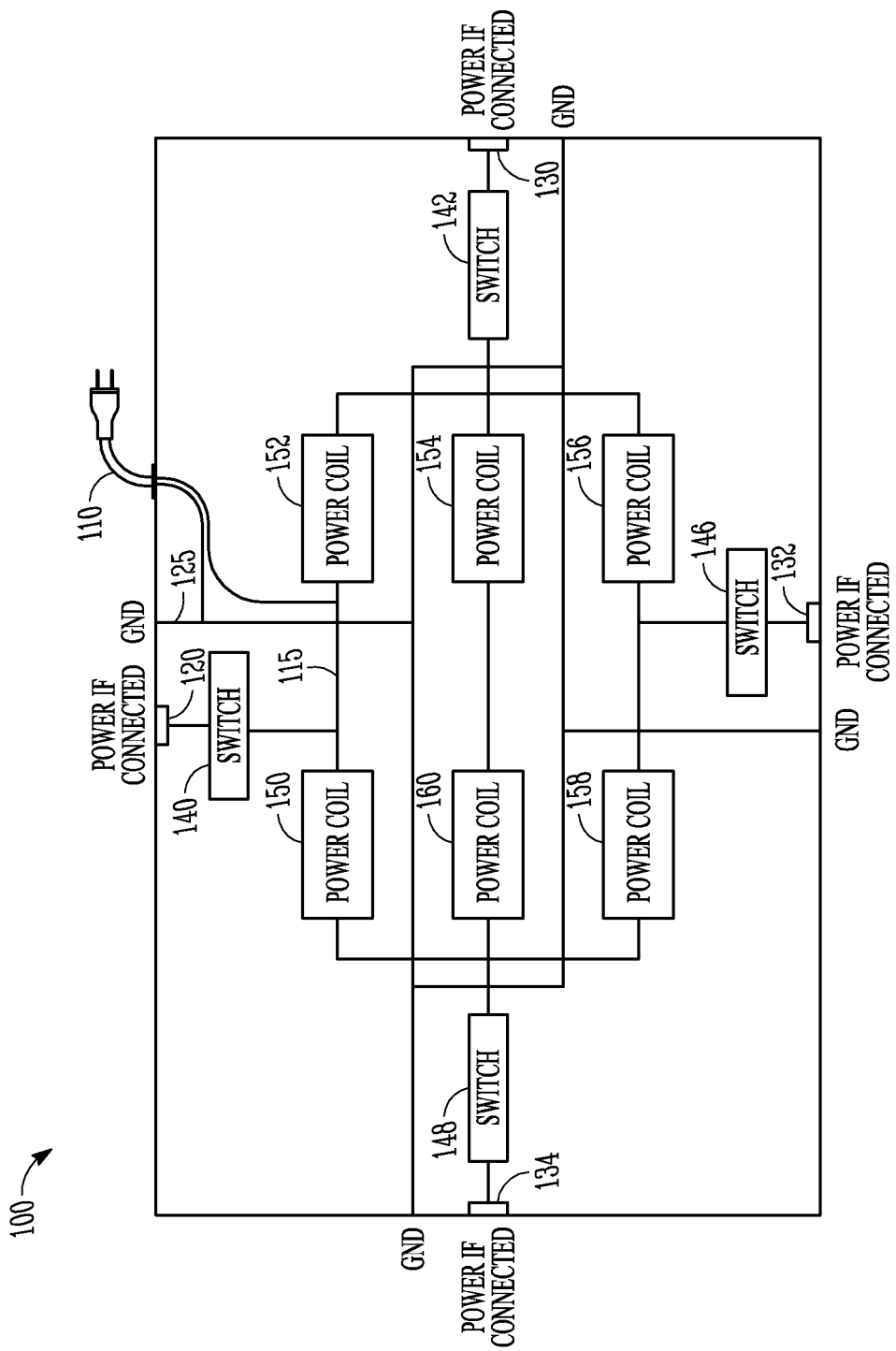
FIG. 1 is a block diagram of a polygonal inductive proximity power pad according to an example embodiment.

FIG. 1 is a block diagram of a polygonal inductive proximity power pad 100 according to an example embodiment. Power pad 100 may be formed in many different shapes, such as polygons. Power pad 100 is shown in a rectangular shape, or a four sided polygon. In one embodiment, the power pad 100 includes an optional connector 110 to connect to a power supply. A power network 115 may be coupled to the connector 110, and to at least one power connector 120 disposed on the periphery of the power pad 100, such as a side of the power pad 100. Power connector 120 may include a ground connection 125 in one embodiment. Multiple other power connectors 120 may be similarly coupled to the power network 115 and disposed on one or more other sides of the pad. Three such power connectors are shown at 130, 132 and 134 in one embodiment.

In one embodiment, the power connectors may be coupled to power connectors on adjacent pads which may be provided by others in one embodiment, and operate to exchange power by either receiving or providing, or receiving and providing power to such adjacent pads having a mating power connector. In various embodiments, power connectors on different sides of the power pad may have female connectors, and others have male connectors that retentatively engage when pad are assembled adjacent each other such that the power networks 115 in each pad receive power. In further embodiments, genderless connector may be used. Many different types of connectors may be used that provide sufficient power transfer. The ground connector may be separate or integrated into the power connector as desired.

In one embodiment, a switch 140 may be used to detect whether connector 120 is engaged with a connector on an adjacent pad. Switch 140 may be part of the connector 120, or may be in line with it, and sense whether a connection has been made with an adjacent pad. In one embodiment, switch 140 is disposed between connector 120 and power network 115. Similarly, switches 142, 146 and 148 may be provided to operate with power connectors 130, 132 and 134 respectively. In one embodiment, any one switch may operate to connect power to the power network and enable operation of the power pad 100. In one embodiment, power and ground lines run to the edges of the pad. No power is available at such edges until another pad is detected. Once a connected pad is detected, then the switch operates to provide current to the connected pad. The switch may be a mechanical, electrical or MEMs switch in various embodiments.

Power pad 100 in one embodiment has one or more power transfer mechanisms such as power coils 150, 152, 154, 156, 158 and 160 coupled to the power network 115. Six such power coils are shown in FIG. 1, however, in further embodiments, one, two, three, four or more may be provided. The power coils comprise coils of conductors that transmit or transfer inductive power to one or more devices placed proximate the coils. The devices may have receiver coils that receive power from the power coils 150. In one embodiment, the coils comprise power transfer coils embedded in the pad and coupled to the power network to transfer power to a device proximate the pad. The device need not be touching the pad in order to receive power, but should be within an electromagnetic field generated by the power coils. In a further embodiment, the power coils include electronics to sense compatible devices, and respond with appropriate power transfer rates. Such electronics may include RF tag technology to identify a device within proximity of each coil, and may also include switches or other components to control the amount of current in the corresponding power coil.

In a further embodiment, the power transfer mechanisms comprise a set of conductors that mate with corresponding conductors on a device to obtain power from the power pad 100. The power coils illustrated in block form in FIG. 1 are also representative of such sets of conductors.

In one embodiment, the power connector 120 includes a latch to securely physically couple an adjacent polygonal pad with a mating power connector and latch. The power pad in some embodiments has a thickness of between 1 and 1.5 cm. The power connectors may be used to couple multiple adjacent power pads to provide a parallel power supply connection. In further embodiments, multiple switches may be provided on one side of the power pad, and multiple power connectors may also be provided on one side of the power pad.

Power pad 100 may be formed by embedding at least one proximity power transfer coil in a polygonal pad. A power transfer network is formed in the polygonal pad and is coupled to the at least one proximity power transfer coil. At least one power transfer connector is provided on a peripheral portion of the polygonal pad to mate with a power transfer connector on an adjacent polygonal pad to transfer power between the two polygonal pads.

Figure 2:
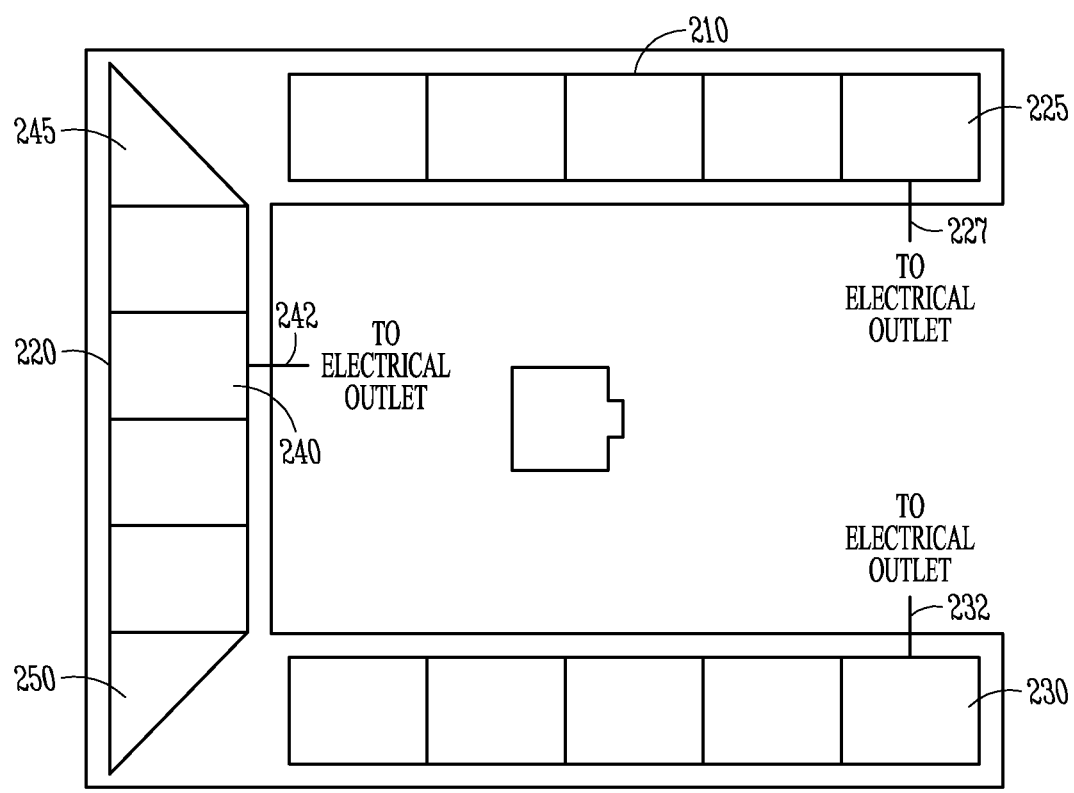
FIG. 2 is a block diagram illustrating different layouts of multiple power pads according to an example embodiment.

FIG. 2 is a block diagram illustrating different layouts of multiple power pads according an example embodiment. A "U" shaped conference table 200 is illustrated with three different layouts 210, 215 and 220 of coupled power pads. Layouts 210 and 215 include sets of five rectangular power pads coupled edge to edge to form a straight line. Power pads 225 and 230 include connections to electrical outlets at 227 and 232 respectively. Such connections to electrical outlets 227 and 232 provide power to the power networks in power pads 225 and 230. The adjacent power pads enable switches such that they receive power from the power connectors and in turn provide power to further connected power pads.

Layout 220 includes four rectangular power pads, with power pad 240 having a connection 242 to an electrical outlet. Power pad 240 thus provides power to each adjacent power pad. Layout 220 also includes two triangular shaped power pads indicated at 245 and 250. The triangular shaped power pads may have one or more power connectors on different sides, and may further be coupled to yet further power pads forming sets of power pads that provide more than a single dimensional layout. In one embodiment, the triangular shaped power pads are right triangles with approximately 45 degree angles for the remaining two angles. Right triangles having different size adjacent legs may be used in further embodiments. In still further embodiments, different types of triangle shapes, such as equilateral and isosceles triangle shapes may be used. In further embodiments, polygons may be used having one or more straight edges and one or more curved edges may be used. While shapes having curved sides may not be true polygons, the term polygon as used herein is meant to encompass such shapes, and in further embodiments, may include three dimensional shapes.

Figure 3:
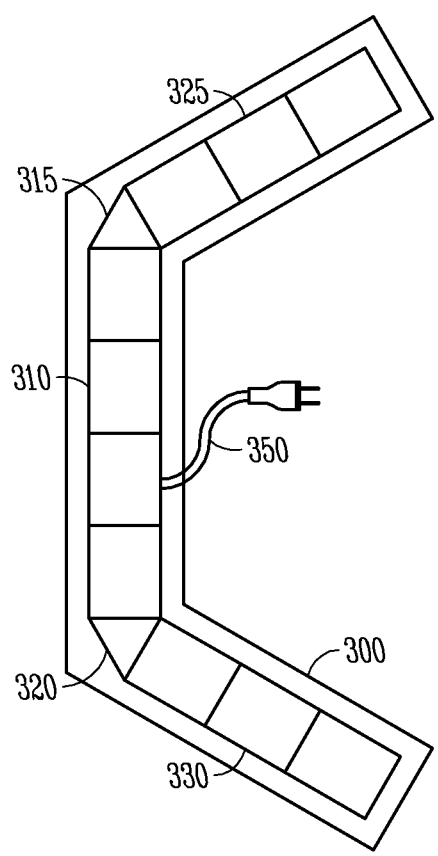
FIG. 3 is a block diagram illustrating a layout of multiple power pads that changes direction according to an example embodiment.

A multidimensional layout of power pads is shown in FIG. 3. In this diagram, a table 300 has a straight portion populated by a series of rectangular power pads 310, and two angled sections 315 and 320. Each end of the straight portion may end in a triangular shaped power pad as indicated at 325 and 330, followed by an additional section of rectangular power pads 335 and 340. In one embodiment, at least one of the power pads is coupled to a power source via power cord 150.

Figure 4:
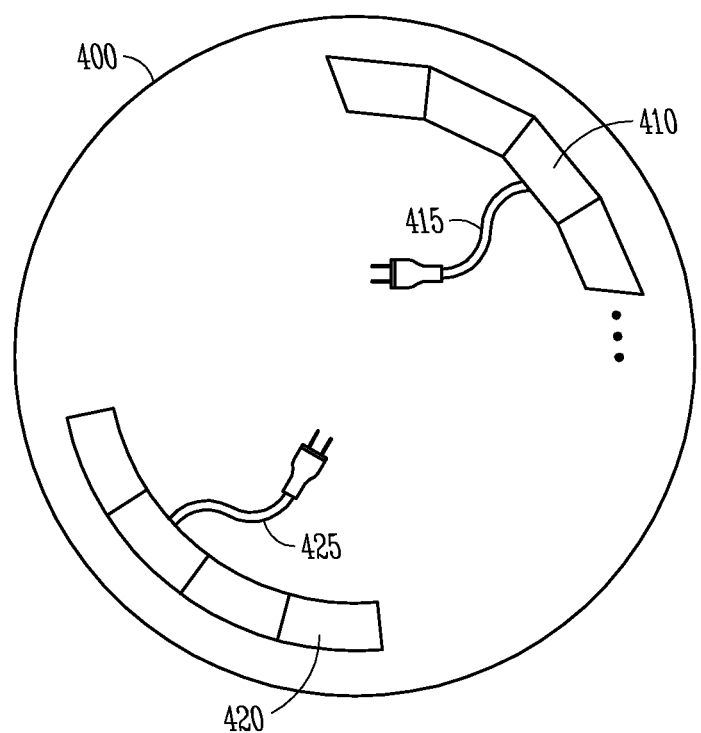
FIG. 4 is a block diagram illustrating different layouts of multiple power pads for a circular table according to an example embodiment.

FIG. 4 illustrates a multidimensional layout of power pads on a round table 400. Multiple trapezoid shaped power pads 410 may be used and coupled at edges to provide power to devices via their power coils. One of the power pads may be coupled to a power source by cord 415. Users may be seated around table 400, and have their cell phones or other devices powered by at least one power coil on any of the power pads, which extend in an arc corresponding to the radius of the table. One power pad may power one or more devices, such as an MP3 player, cellular phone, personal digital assistant, laptop computer or many different types of wireless devices in various embodiments. In one embodiment, there may be some play in the power connectors, allowing edges of the pads to deviate from flush to each other. Such play allows the pads to be used for tables having arced edges of different radii. Also shown in FIG. 4 are arc shaped power pads 420 which are also placed end to end to share power and power one or more devices in proximity to the coils therein. A power cord 425 may also be provided with one or more of the pads. In a further embodiment, an arc shaped power pad may couple to a trapezoid, rectangular or triangle shaped power pad to share power.

Figure 5:
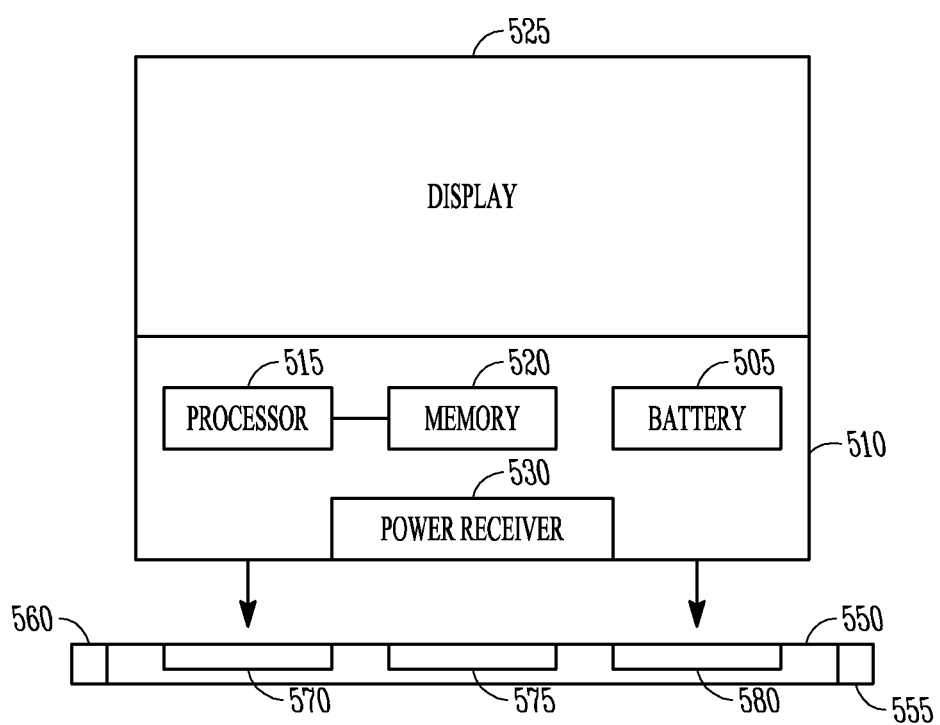
FIG. 5 is a block diagram illustrating a proximity power pad with a device to receive power from the pad according to an example embodiment.

FIG. 5 is a block cross sectional diagram of a system 500 that includes a battery (505) powered information handling system 510 having a main processor, a main memory 520, a display 525, and a power receiving mechanism 530 such as a coil or a set of contacts. A polygonal pad 550 includes a power network as described above and at least one power connector (555 and 560 are shown) coupled to the power network and disposed on a periphery of the pad 550. The power connectors 555 and 560 are operable to exchange power with a provided adjacent pad, not shown. At least one power transfer mechanism, three of which are shown at 570, 575 and 580, may be embedded in the pad 550. The power transfer mechanisms may be coils or sets of contacts or conductors as described above, and are coupled to the power network to transfer power to the receiving mechanism 530 of the battery powered information handling system 510 while proximate to said polygonal pad 550. The information handling system 510 may be placed on the pad in one embodiment as indicated by the arrows. In one embodiment, the power connectors 555 and 560 further include a latch to securely physically couple a provided adjacent polygonal pad with a mating power connector and latch.

The Abstract is provided to comply with 37 C.F.R. §1.72(b) and is submitted with the understanding that it will not be used to interpret or limit the scope or meaning of the claims.

The invention claimed is:
1. A power pad comprising:
a polygonal pad including:
   a power network;
   a first power connector coupled to the power network and disposed on a first side of the polygonal pad, the first power connector operable to exchange power with a provided power pad, the provided power pad connected to the polygonal pad through the first power connector;
   a switch coupled between the first power connector and the power network, the switch operable to sense whether a connection between the provided power pad and the first power connector has been established, and the switch operable to provide current to the provided power pad when the connection has been established; and at least one power transfer mechanism embedded in the polygonal pad and coupled to the power network to transfer power to a device proximate the polygonal pad.

2. The power pad of claim 1 wherein the polygonal pad includes a second side, and wherein a second a power connector is coupled to the second side of the polygonal pad, the second side of the polygonal pad adjacent to the first side of the polygonal pad.

3. The power pad of claim 2 wherein the polygonal pad is a rectangle.

4. The power pad of claim 2 wherein the polygonal pad is a triangle.

5. The power pad of claim 2 wherein the polygonal pad includes an arc on at least one side.

6. The power pad of claim 1 wherein the power transfer mechanism comprises a power coil.

7. The power pad of claim 1 wherein the power transfer mechanism comprises a set of conductors.

8. The power pad of claim 1 wherein the first power connector further comprises a latch to securely physically couple the provided power pad with a mating power connector and latch.

9. The power pad of claim 8 wherein the first power connector couples the provided power pad to provide a parallel power supply connection.

10. The power pad of claim 9 wherein the first power connector couples the provided power pad to provide a parallel power supply connection.

11. An apparatus comprising:
a battery powered information handling system having a main processor, a main memory, a display, and a power receiving mechanism; and
a polygonal pad including:
a power network;
a first power connector coupled to the power network and disposed on a first side of the polygonal pad, the first power connector operable to exchange power with a provided power pad, the provided power pad coupled to the first side of the polygonal pad through the first power connector;
a switch coupled between the first power connector and the power network, the switch operable to sense whether a connection between the provided power pad and the first power connector has been established, and the switch operable to provide current to the provided power pad when the connection has been established; and
at least one power transfer mechanism embedded in the polygonal pad and coupled to the power network to transfer power to the receiving mechanism of said battery powered information handling system while proximate to said polygonal pad.

12. The apparatus of claim 11 wherein the power transfer mechanism comprises a power coil.

13. The apparatus of claim 11 wherein the power transfer mechanism comprises a set of conductors.

14. The apparatus of claim 11 wherein the first power connector further comprises a latch to securely physically couple the provided power pad with a mating power connector and latch.

15. A method comprising:
embedding at least one proximity power transfer mechanism in a first polygonal pad;
forming a power transfer network in the first polygonal pad that is coupled to the at least one proximity power transfer mechanism;
providing a first power transfer connector on a first side of the first polygonal pad, the first power transfer connector configured to mate with a second power transfer connector, the second power transfer connector on a second polygonal pad, the first power transfer connector operable to transfer power between the first polygonal pad and the second polygonal pad, the second polygonal pad coupled to the first side of the first polygonal pad through the first power transfer connector; and
providing a switch coupled between the first power transfer connector and the power transfer network, the switch operable to sense whether a connection between the second power transfer connector and the first power transfer connector has been established, and the switch operable to provide current to the second polygonal pad when the connection has been established.

16. The method of claim 15 and further comprising providing a switch to couple the first power transfer connector to the power network.

17. The method of claim 15 and further comprising providing a power transfer connector coupled on each side of the polygonal pad.

18. The method of claim 15 wherein the polygonal pad is a rectangle.

19. The method of claim 15 and further comprising connecting multiple polygonal pads to each other via their power transfer connectors to form a set of polygonal pads operable to draw power from each other, and operable to power devices placed proximate power transfer mechanisms in the polygonal pads.

20. A system comprising:
a battery powered information handling system having a processor, a memory, a display, and a power receiving coil; and a first power pad including:
a power network;
at least one power connector;
at least one power transfer coil embedded in the first power pad and coupled to the power network to transfer power to the receiving coil of said battery powered information handling system while proximate to said first power pad; and
a switch coupled between the power connector and the power network, the switch operable to sense whether a connection between the first power pad and the first power connector has been established, and the switch operable to provide current to the first power pad when the connection has been established.

* * * * *